United States Patent
Henson

(10) Patent No.: US 8,406,453 B2
(45) Date of Patent: Mar. 26, 2013

(54) SECURITY SYSTEM AND METHOD OF IN-FLIGHT ENTERTAINMENT DEVICE RENTALS HAVING SELF-CONTAINED AUDIOVISUAL PRESENTATIONS

(75) Inventor: Robert Ray Henson, Spanaway, WA (US)

(73) Assignee: Digecor, Inc., Springville, UT (US)

( * ) Notice: Subject to any disclaimer, the term of this patent is extended or adjusted under 35 U.S.C. 154(b) by 1425 days.

(21) Appl. No.: 10/657,822

(22) Filed: Sep. 8, 2003

(65) Prior Publication Data

US 2005/0053237 A1 Mar. 10, 2005

(51) Int. Cl.
G06K 9/00 (2006.01)
H04N 7/167 (2011.01)

(52) U.S. Cl. ........................ 382/100; 380/217

(58) Field of Classification Search .................. 382/100; 380/217, 232, 277, 201, 231; 713/176; 726/2
See application file for complete search history.

(56) References Cited

U.S. PATENT DOCUMENTS

| | | | |
|---|---|---|---|
| 4,630,821 A | 12/1986 | Greenwald | |
| 4,866,515 A | 9/1989 | Tagawa et al. | |
| 6,785,815 B1 | 8/2004 | Serret-Avila et al. | |
| 6,807,148 B1 * | 10/2004 | Eicher | 370/217 |
| 6,859,535 B1 * | 2/2005 | Tatebayashi et al. | 380/201 |
| 7,043,019 B2 * | 5/2006 | Tehranchi et al. | 380/218 |
| 7,088,823 B2 * | 8/2006 | Fetkovich | 380/255 |
| 7,099,473 B2 * | 8/2006 | Maeda | 380/239 |
| 2002/0027992 A1 * | 3/2002 | Matsuyama et al. | 380/231 |
| 2002/0085588 A1 * | 7/2002 | Giaccherini et al. | 370/487 |
| 2002/0112161 A1 * | 8/2002 | Thomas et al. | 713/176 |
| 2002/0114453 A1 * | 8/2002 | Bartholet et al. | 380/44 |
| 2002/0159592 A1 * | 10/2002 | Matsushima et al. | 380/201 |
| 2003/0018917 A1 * | 1/2003 | Brown, Sr. | 713/201 |
| 2003/0074563 A1 * | 4/2003 | Spacey | 713/181 |
| 2004/0015993 A1 * | 1/2004 | Yacenda et al. | 725/87 |

* cited by examiner

Primary Examiner — Andrae S Allison
(74) Attorney, Agent, or Firm — Durham Jones & Pinegar, P.C. Intellectual Property Law Group

(57) ABSTRACT

A security method for in-flight entertainment device (IFED) rentals having self-contained audiovisual presentations is disclosed. A self-contained IFED has internal storage configured to contain current releases of movies and other audiovisual presentations. The method provides layers of security including a unique bit stream encoding format, watermarking, camera artifacts, file encryption, hard drive encryption, input-output encryption, physically unique connectors, and a tamper-resistant casing for the self-contained IFEDs.

17 Claims, 5 Drawing Sheets

SECURITY SYSTEM AND METHOD OF IN-FLIGHT ENTERTAINMENT DEVICE RENTALS HAVING SELF-CONTAINED AUDIOVISUAL PRESENTATIONS

BACKGROUND OF THE INVENTION

1. Field of the Invention

The present invention is directed generally to security measures for electronic devices and, more particularly, to security measures for entertainment devices having self-contained audiovisual presentations for rent to passengers of conveyances such as commercial airline flights.

2. Description of the Related Art

Rental of entertainment devices having self-contained audiovisual presentations to be used by passengers during a commercial airline flight can provide individually tailored current entertainment and other services to the passengers during the commercial flight. Unfortunately, conventional security measures for electronic devices generally afford an insufficient degree of protection from theft of the valuable audiovisual (AV) properties that would be stored on the self-contained in-flight entertainment device. Without a level of security greater than conventional approaches, adoption of self-contained in-flight entertainment devices having current movies and other audiovisual presentations could suffer due to risks involved with allowing members of the general public to rent such devices. Consequently, prior support for their implementation has not been available.

BRIEF SUMMARY OF THE INVENTION

The present invention resides in a security system and method of in-flight entertainment device rentals having self-contained audiovisual presentations. Aspects include receiving an audiovisual master file from a movie recording studio or other organization containing an audiovisual presentation such as a to-be-released or recently released movie, the audiovisual master file being in a first encoded and compressed format. Aspects further include adding watermark characters to the encoded audiovisual master file, adding camera artifacts to the encoded audiovisual master file, encrypting the encoded audiovisual master file to create an encrypted encoded audiovisual master file, generating keys associated with the encrypted encoded audiovisual master file for use in decoding the encrypted encoded audiovisual master file, and transmitting the encrypted encoded audiovisual master file and the associated keys to a distribution point host computer. Aspects further include loading the transmitted encrypted encoded audiovisual master file on the distribution point host computer, linking the distribution point host computer with a self-contained entertainment device and establishing bi-directional authentication between the distribution point host computer and the self-contained entertainment device through use, in part, of an input-output of the self-contained entertainment device, and, after bi-directional authentication occurs, using the distribution point host computer to delete at least some of the previously loaded encrypted encoded audiovisual master files from the self-contained entertainment device. Aspects further include using the distribution point host computer to transfer the newly loaded encrypted encoded audiovisual master file and keys associated with the newly loaded encrypted encoded audiovisual master file to the self-contained entertainment device to which the distribution point host computer is linked without decryption of the newly loaded encrypted encoded audiovisual master file being transferred to the self-contained entertainment device; and storing the newly loaded encrypted encoded audiovisual master file and the keys associated with the newly loaded encrypted encoded audiovisual master file on an encrypted hard drive of the self-contained entertainment device to which the distribution point host computer is linked.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

A security method and system of in-flight entertainment device (IFED) rentals having self-contained audiovisual presentations is disclosed herein. A self-contained IFED has internal storage configured to contain current releases of movies and other audiovisual presentations. According to implementations of the present system and method, the self-contained IFED can be rented by passengers of commercial airline flights for viewing of such movies and other audiovisual presentations during the flight. Use of the self-contained IFED provides a selection of audiovisual presentations from which the passengers renting the self-contained IFED can choose. This individualizes the selection opportunity provided to each passenger by the self-contained IFED and increases the potential for enjoyment by the passengers compared with conventional systems that display one audiovisual presentation to a large group of passengers with the passengers having no input on the particular audiovisual property being presented.

Figure 1:
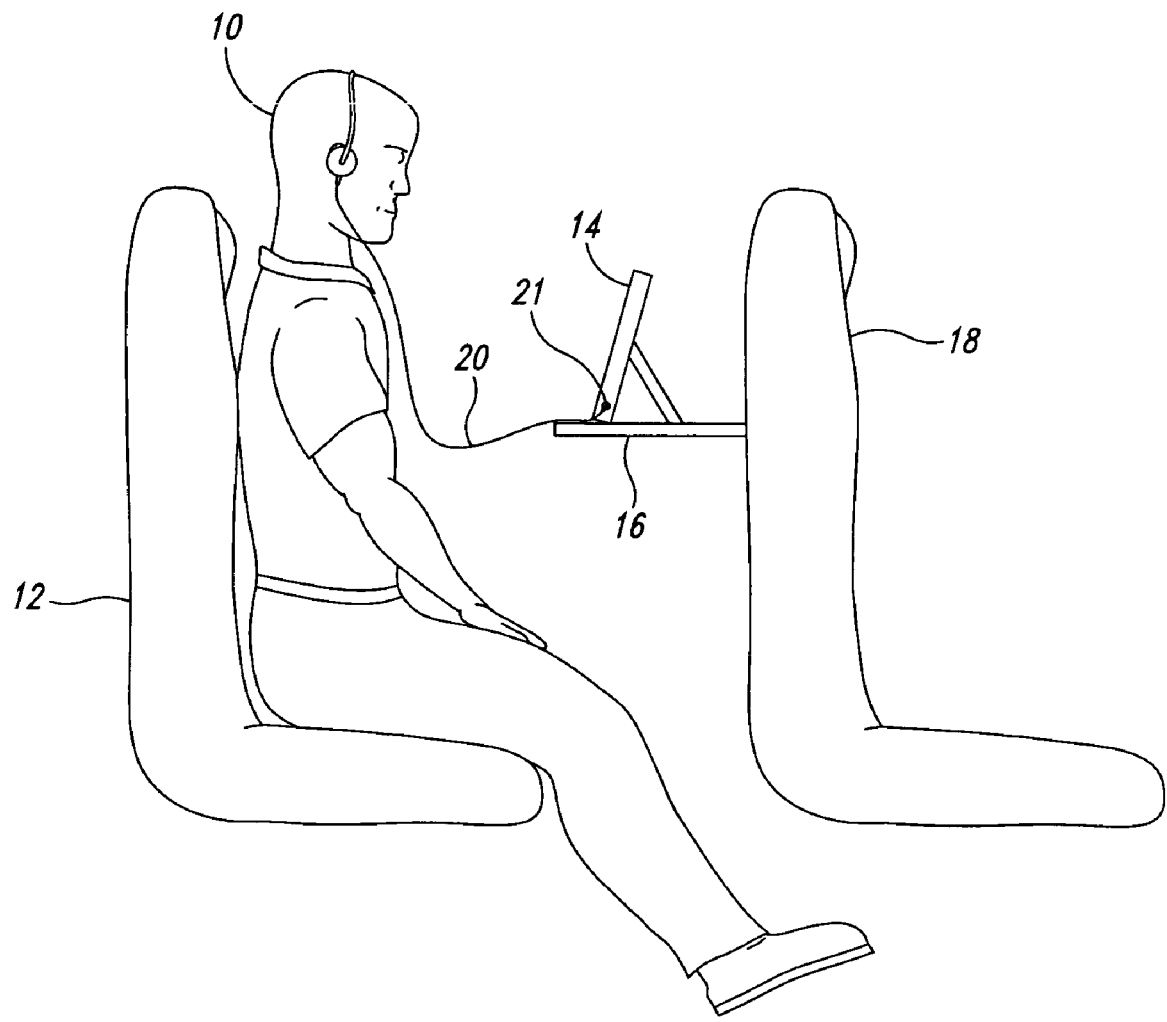
FIG. 1 is a side-view of a passenger viewing an audiovisual presentation being presented by a representative self-contained in-flight entertainment device (IFED) rental while traveling during a commercial flight.
Figure 2:
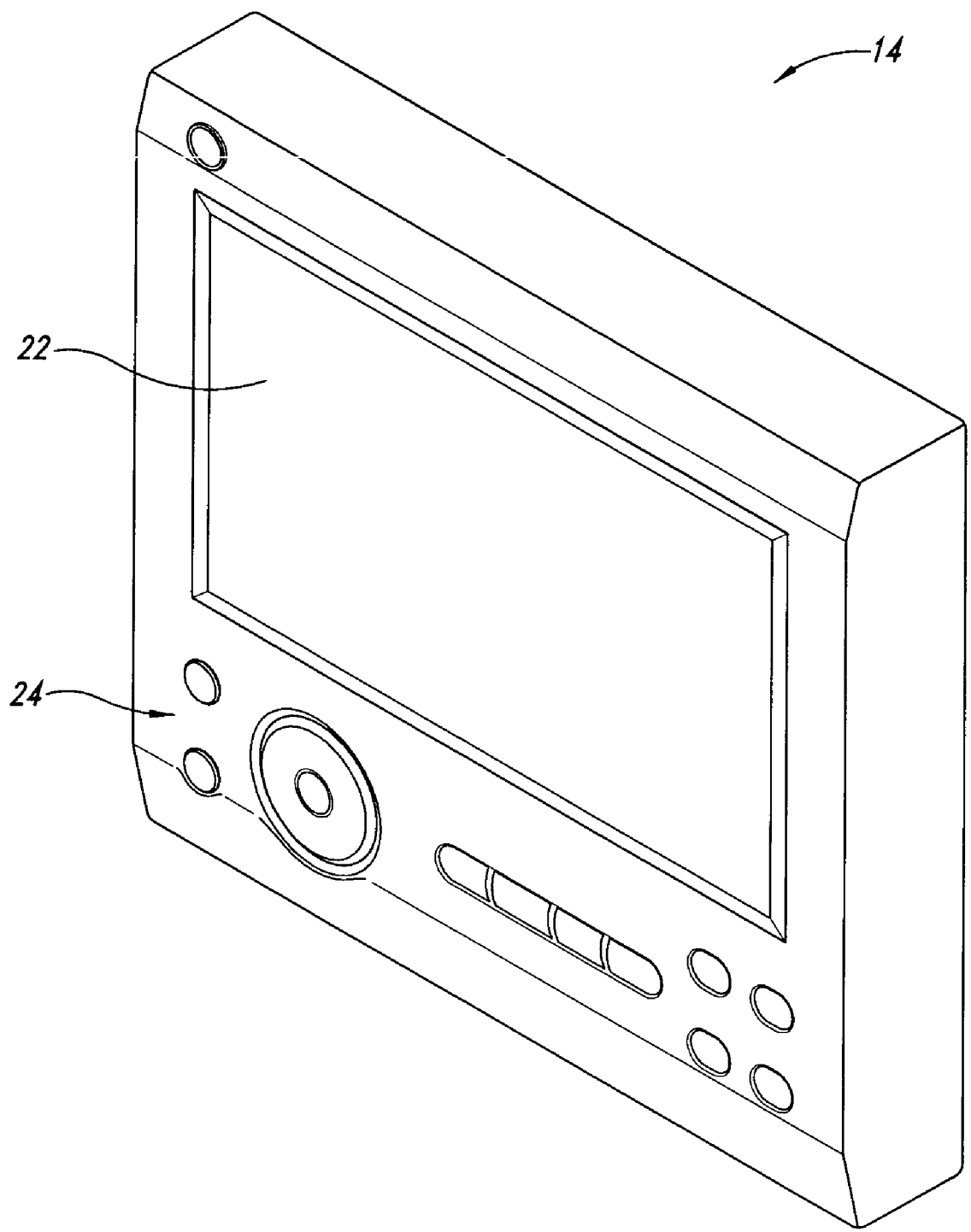
FIG. 2 is a perspective view of the self-contained IFED of FIG. 1.

As shown in FIG. 1, a passenger 10, while seated in aircraft seat 12, can view a movie being presented by a self-contained IFED 14 resting on a seat back table 16 that is connected to a forwardly adjacent aircraft seat 18. As is conventional practice, earphones 20 are plugged into a sound output 21 on the self-contained IFED 14 to allow the passenger 10 to listen to the audio portion of the presentation without disturbing fellow passengers. The self-contained IFED 14, further depicted in FIG. 2, includes a display 22 for viewing presentations and controls 24 for selection of presentations and adjustment of the self-contained IFED 14.

Figure 3:
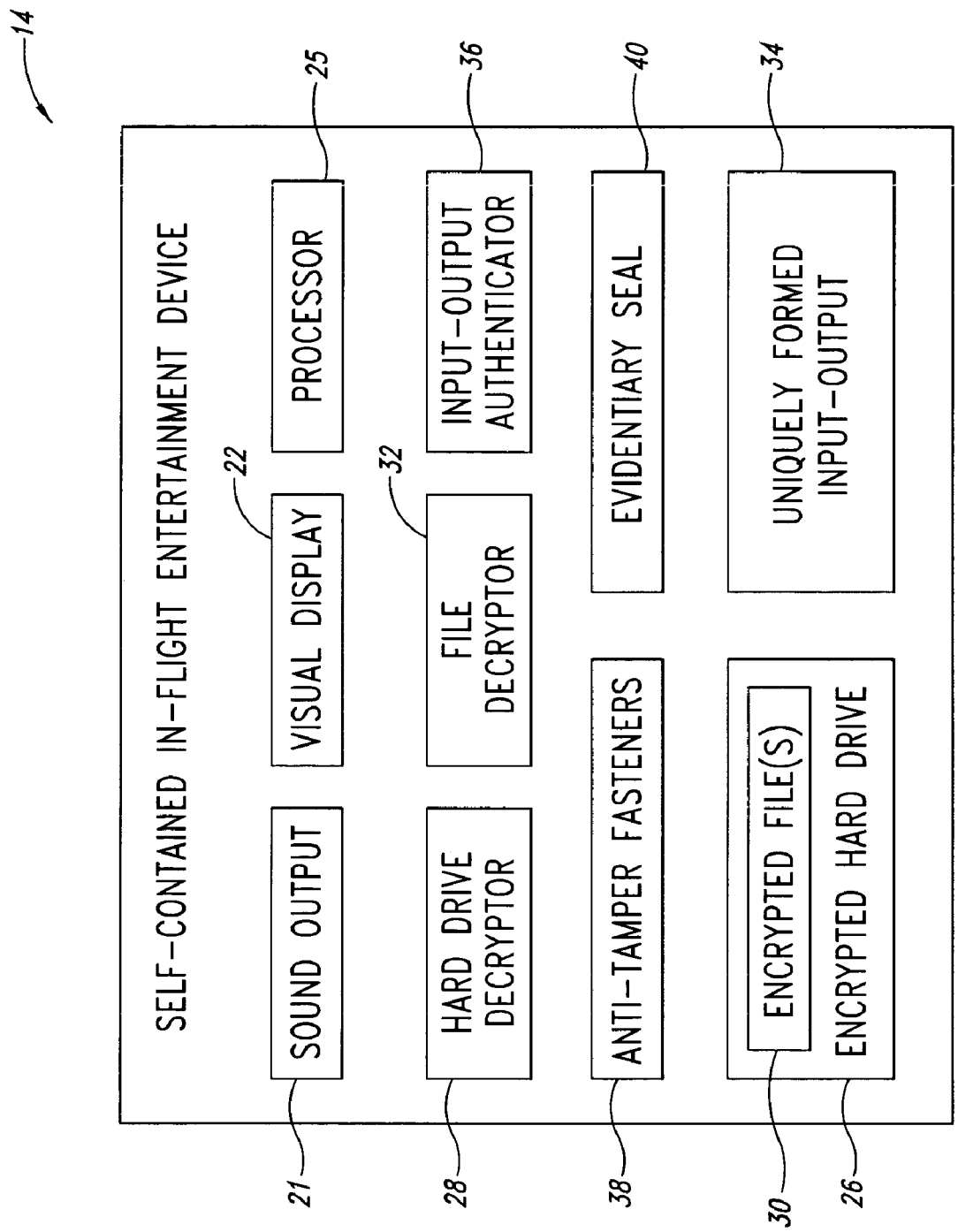
FIG. 3 is a schematic view of various elements of the self-contained IFED of FIG. 2 including elements related to security of the one or more audiovisual files stored on the self-contained IFED.

The self-contained IFED 14 contains a processor 25, as shown in FIG. 3, for interaction and control of various other components of the self-contained IFED 14. An encrypted hard drive 26 is included for storing one or more files containing current movies or other audiovisual presentations. The encrypted hard drive 26 is accessible through a hard drive decryptor 28 so that both encrypted files 30 containing current movies and other proprietary property and unencrypted files (not shown) are protected by the encryption mechanisms associated directly with the encrypted hard drive 26. The encrypted files 30 are further protected by their own encryption mechanisms and are only accessible through a file decryptor 32 containing one or more decryption keys for reading of the encrypted files 30.

An input-output 34 of unique physical configuration is used to delete out-dated audiovisual presentations from the encrypted hard drive 26 and to transfer current movie releases and other audiovisual presentations to the encrypted hard drive 26. The input-output 34 is formed such that a specially formed connector of a unique shape complementary to the input-output 34 is used to connect a workstation to the self-contained IFED 14 for file deletion and loading activities. An input-output authenticator 36 is used to verify that the workstation connected to the self-contained IFED 14 through the input-output 34 has authorized access privileges. Although the input-output 34 has a unique physical configuration, it can still use standard protocols such as USB 2.0 or IEEE 1394, which can be utilized for the authorization process. Even when access privileges are granted, in some implementations, no read access to obtain files from the encrypted hard drive 26 is allowed.

Anti-tamper fasteners 38 are used to physically secure the case of the self-contained IFED 14 together, thereby requiring a unique tool for physically accessing internal components of the self-contained IFED 14. An evidentiary seal 40 is used to seal an internal portion of the self-contained IFED 14 in such a way that if physical access is achieved to the internal components of the self-contained IFED 14, then the evidentiary seal 40 is broken and easily visible upon inspection.

Figure 4:
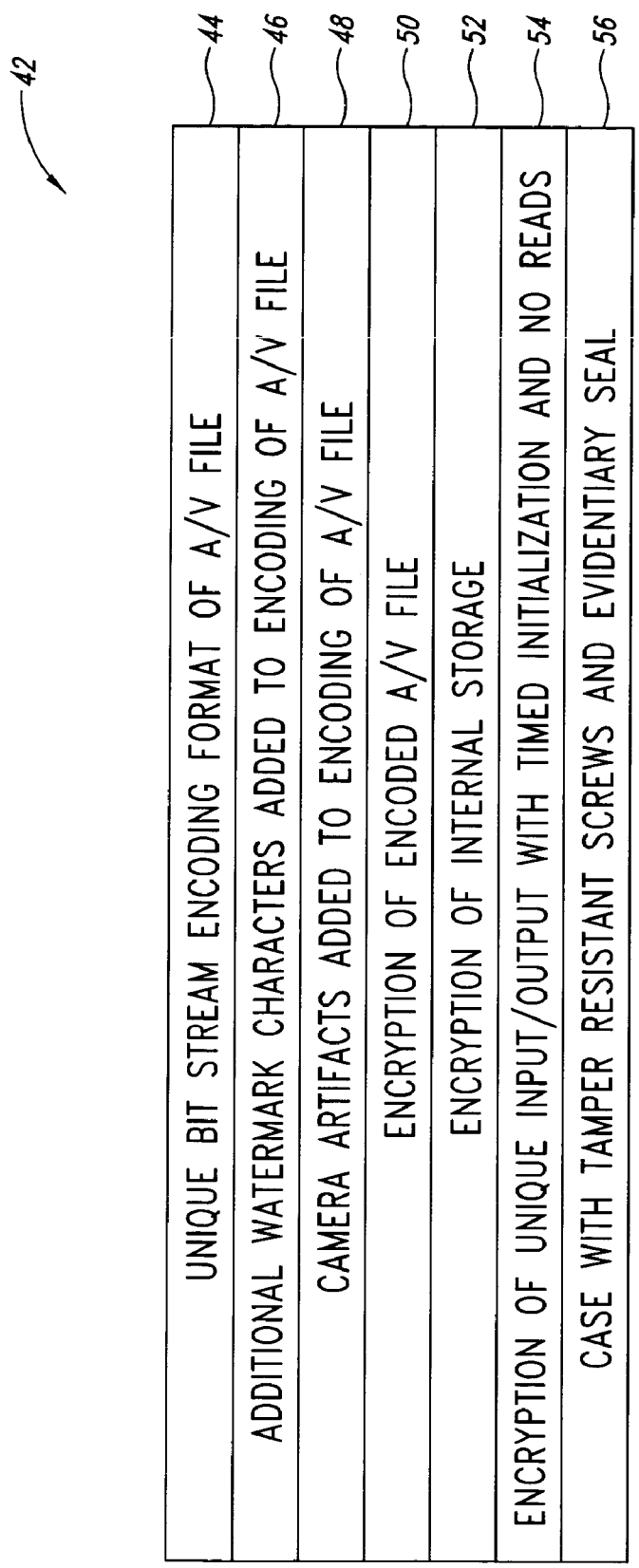
FIG. 4 is a schematic view of various levels of security associated with implementations of the IFED of FIG. 2.

The various layers of security 42 associated with the self-contained IFED 14 are summarized in FIG. 4 as including one or more encoded files of one or more original master recordings received from a movie recording studio or other organization. Typically, each original master recording will be processed to generate a separate encoded file in a compressed format, such as MPEG-4 Advanced Simple Profile with DVD playback quality of approximately 1 Mbps. Other implementations have other modes of compression and display quality. The encoded files are encoded with a unique bit stream encoding format (layer 44) such that the processor 25 (FIG. 3) of the IFED 14 is specially configured to render the encoded file for display. Consequently, in the event other security layers discussed herein are breached, the special configuration of the processor 25 will still be needed for viewing, which will help to prevent piracy. During encoding, a digital process is used to add additional characters to the encoded file as a watermark (layer 46) to identify details such as time and place of the encoding to assist in forensic tracking if needed through watermark detection software.

Some implementations further include the addition of camera artifacts to the encoded files (layer 48) during the encoding process. Camera artifacts are used to hinder illegal video recording taken of movies being displayed on the self-contained IFED 14. The camera artifacts are displayed on the display 22 of the self-contained IFED 14 when the encoded file is played on the self-contained IFED 14, but are not visible to the passenger 10. Instead, if video recordings are taken of the display 22 during play of the encoded file, the camera artifacts are visible when these video recordings are viewed. Thus, attempts at recording video content from the self-contained IFED 14 for later viewing on equipment other than the self-contained IFED 14 can be hindered.

After the encoding process is completed, the encoded files are encrypted, thereby producing encrypted encoded audiovisual files (layer 50). During encryption, a unique key for decryption is generated for each individual file, which is required for subsequent playing of the file and is handled by the file decryptor 32 of the self-contained IFED 14. The encrypted encoded audiovisual files are stored on the encrypted hard drive 26 (layer 52) such that the hard drive decryptor 28, having decryption methods separate from those used to decrypt the individual encrypted files 30, is necessary for accessing the encrypted files 30.

In some implementations only the input-output 34 is available for external access to the encrypted hard drive 26. As explained above the input-output 34 has a unique physical configuration. Also, the input-output 34 uses protocols that require authorization through the input-output authenticator 36 to occur within a limited window of time, otherwise physical reconnection to the input-output 34 is necessary for further access attempts (layer 54). In some implementations, the operation of the encrypted hard drive 26 together with the input-output 34 only allows for write and delete functions without allowing read functions, which can also add to the security provided under layer 54. As discussed, the self-contained IFED 14 also has anti-tamper fasteners 38 and an evidentiary seal 40 (layer 56) for an additional layer of security.

Figure 5:
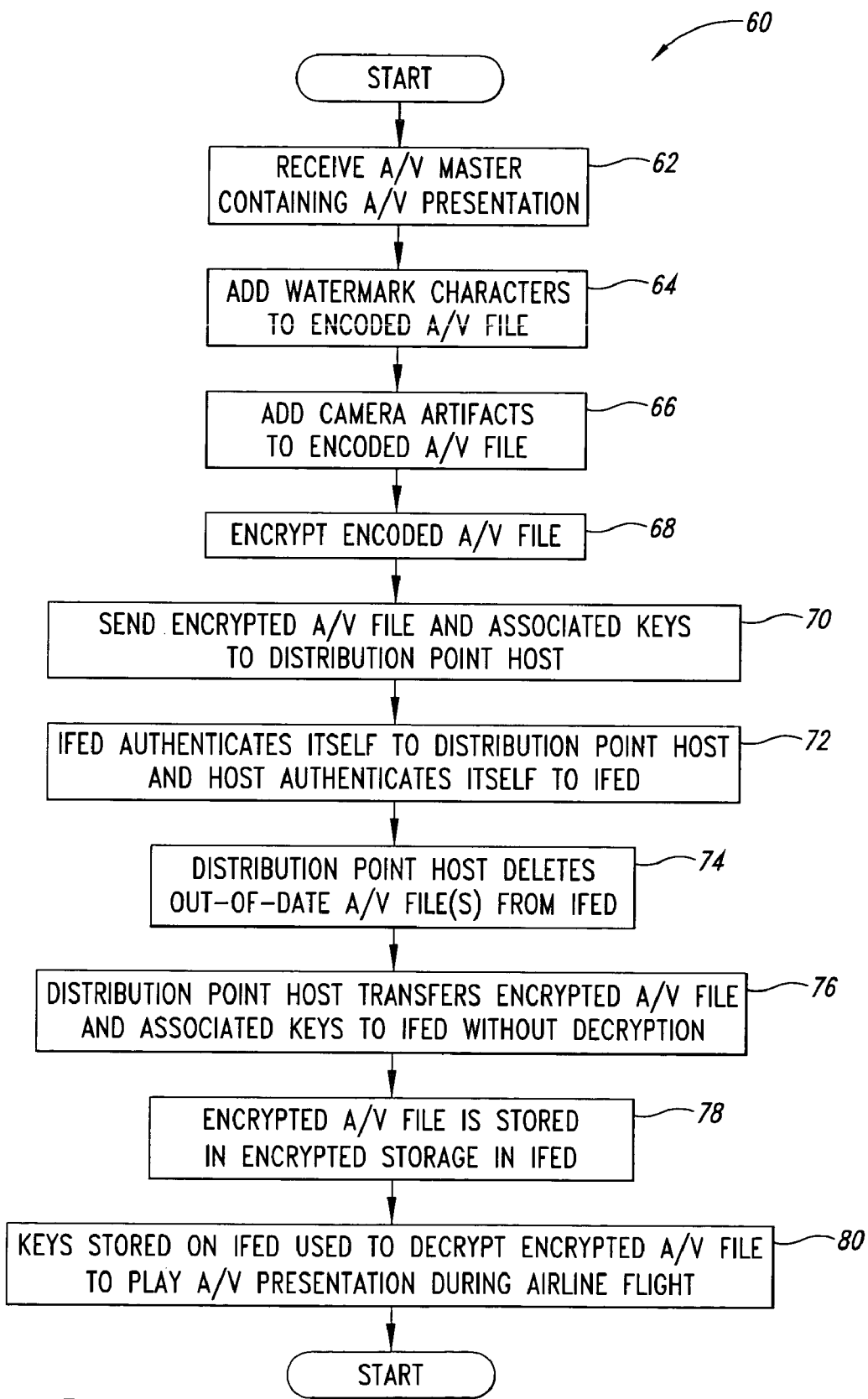
FIG. 5 is a flow-chart of a method associated with security elements of the IFED of FIG. 2.

A flow-chart of a method 60 associated with security elements of the self-contained IFED 14 is shown in FIG. 5. The method 60 begins with receiving an audiovisual master from a movie recording studio or other organization containing an audiovisual presentation such as a to-be-released or recently released movie (step 62). The audiovisual master is encoded with the special format discussed above and watermark characters are added to the encoded audiovisual file (step 64). In some implementations, camera artifacts are also added during the encoding process (step 66). The encoded audiovisual file is next encrypted (step 68) and then sent (as well as associated keys) to a distribution point host computer (step 70). The encrypted encoded audiovisual files are loaded on to the distribution host computer. The distribution host computer then links with one of the pluralities of the self-contained IFED 14 in which bi-directional authentication occurs between the distribution host computer and the self-contained IFED 14 through use in part of the input-output 34 of the self-contained IFED 14 (step 72).

Once the bi-directional authentication occurs, the distribution host computer can be used to delete out-of-date audiovisual files from the self-contained IFED 14 (step 74). The distribution host computer can then transfer the encrypted encoded files along with the associated keys to the self-contained IFED 14 without need of decryption of the files occurring (step 76). Consequently, the encrypted audiovisual files are stored on the encrypted hard drive 26 of the self-contained IFED 14 (step 78). Also, the keys associated with the encrypted audiovisual files are stored on the self-contained IFED 14 to be used for subsequent decryption of the encrypted audiovisual files for display of the associated audiovisual presentations (e.g. current release movies), such as during an airline flight (step 80) to an airline passenger who rented the self-contained IFED 14.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:
1. A method comprising:
 receiving an audiovisual master file from a movie recording studio or other organization containing an audiovisual presentation including a to-be-released or recently released movie, the audiovisual master file being in a first encoded and compressed format;

adding watermark characters to the encoded audiovisual master file, the watermark characters identifying time and place of encoding;

adding camera artifacts to the encoded audiovisual master file;

encrypting the encoded audiovisual master file to create an encrypted encoded audiovisual master file;

generating keys associated with the encrypted encoded audiovisual master file for using in decoding the encrypted encoded audiovisual master file;

transmitting the encrypted encoded audiovisual master file and the associated keys to a distribution point host computer;

loading the transmitted encrypted encoded audiovisual master file on the distribution point host computer;

linking the distribution point host computer with a self-contained entertainment device and establishing bidirectional authentication between the distribution point host computer and the self-contained entertainment device through use, in part, of an input-output of the self-contained entertainment device, wherein the self-contained entertainment device including a display, processor and hard drive integrally formed in a single, portable device;

after bi-directional authentication occurs, using the distribution point host computer to delete at least some of the previously loaded encrypted encoded audiovisual master files from the self-contained entertainment device;

using the distribution point host computer to transfer the newly loaded encrypted encoded audiovisual master file and keys associated with the newly loaded encrypted encoded audiovisual master file to the self-contained entertainment device to which the distribution point host computer is linked without decryption of the newly loaded encrypted encoded audiovisual master file being transferred to the self-contained entertainment device; and storing the newly loaded encrypted encoded audiovisual master file and the keys associated with the newly loaded encrypted encoded audiovisual master file on the hard drive of the self-contained entertainment.

2. The method of claim 1 further including using the self-contained entertainment device to subsequently decrypt the newly loaded encrypted encoded audiovisual master file stored on the encrypted hard drive of the self-contained entertainment device using the keys associated with the newly loaded encrypted encoded audiovisual master file stored on an encrypted hard drive of the self-contained entertainment device to display audiovisual presentation of the newly loaded encrypted encoded audiovisual master file stored on the encrypted hard drive of the self-contained entertainment device to a person who rented the self-contained entertainment device.

3. The method of claim 1, wherein adding camera artifacts to the encoded audiovisual master file includes adding elements invisible to the naked eye upon display of the audiovisual master file, but visible to the naked eye upon display of a video recording of the audiovisual master file.

4. A self-contained entertainment device, comprising:
a sound output;
a visual display;
a processor;
encrypted audiovisual files;
an encrypted hard drive containing the encrypted audiovisual files;
a hard drive decryptor configured for decrypting the encrypted hard drive;
a file decryptor for decrypting the encrypted files using one or more keys associated with respective audio visual files and received from a distribution device;
an input-output with a unique physical configuration;
an input-output authenticator configured to authenticate the distribution device attempting to communicatively link to the input-output only during a limited time window;
a case being secured with anti-tamper fasteners, the case being portable and housing the visual display, processor and encrypted hard drive; and
an evidentiary seal positioned to rupture when a portion of the case is disassembled.

5. The device of claim 4, wherein the device is an in-flight entertainment device for use during a commercial airline flight, is portable within the aircraft of the commercial airline flight, and is disconnected from the distribution device during the commercial airline flight.

6. The device of claim 4, wherein the input-output provides write access to a distribution point host computer, but does not provide read access to the distribution point host computer.

7. The device of claim 4, wherein the hard drive decryptor and file decryptor are on a same physical device.

8. The device of claim 7, wherein the hard drive decryptor is configured to use decryption methods separate from those used by the file decryptor to decrypt individual encrypted files.

9. The device of claim 4, wherein the input-output is on an in-flight entertainment device and the unique physical configuration includes a shape complementary to a shape of a uniquely formed connector configured to physically couple the device to a distribution point host computer, the shape being unique relative to a communication protocol of the input-output.

10. The device of claim 9, wherein the unique physical coordination is configured to communicate through a standard communication protocol.

11. The device of claim 10, wherein the standard communication protocol includes at least one of USB 2.0 or IEEE 1394, while the uniquely formed connector has a shape other than that for a respective one of USB 2.0 or IEEE 1394.

12. The device of claim 4, wherein the input-output is a hard-wired connection configured to provide a sole and exclusive source for external access to update content on the encrypted hard drive.

13. The device of claim 4, wherein the input-output authenticator is configured to require a physical disconnection and reconnection between the distribution device and the device at the input-output when authentication is attempted outside of the limited time window.

14. A method comprising:
receiving an audiovisual master file from a movie recording studio or other organization containing an audiovisual presentation, the audiovisual presentation being a to-be-released or recently released movie, the audiovisual master file being in a first encoded and compressed format;

encrypting the encoded audiovisual master file to create an encrypted encoded audiovisual master file;

generating keys associated with the encrypted encoded audiovisual master file for using in decoding the encrypted encoded audiovisual master file;

transmitting the encrypted encoded audiovisual master file and the associated keys to a distribution point host computer;

loading the transmitted encrypted encoded audiovisual master file on the distribution point host computer;

linking the distribution point host computer with a self-contained entertainment device and establishing bi-directional authentication between the distribution point host computer and the self-contained entertainment device through use, in part, of an input-output of the self-contained entertainment device, the input-output being configured to connect to an input-output authenticator configured to perform authentication of the distribution point host computer only during a limited time window, the self-contained entertainment device also including a processor, display and hard drive integrally embedded within a single, portable housing;

using the distribution point host computer to transfer the newly loaded encrypted encoded audiovisual master file and keys associated with the newly loaded encrypted encoded audiovisual master file to the self-contained entertainment device to which the distribution point host computer is linked; and storing the newly loaded encrypted encoded audiovisual master file and the keys associated with the newly loaded encrypted encoded audiovisual master file on the hard drive of the self-contained entertainment device to which the distribution point host computer is linked.

15. A self-contained, portable entertainment device, comprising:

a sound output;
a visual display;
a processor;
encrypted audiovisual files;
an encrypted hard drive containing the encrypted audiovisual files;
a hard drive decryptor configured for decrypting the encrypted hard drive;
a file decryptor for decrypting the encrypted files using one or more keys received from a distribution device; and
an input-output authenticator configured to authenticate the distribution device attempting to communicatively link to the input-output, and to do so only during a limited time window.

16. The device of claim 15, wherein the device includes an in-flight entertainment device and the device attempting to communicatively link to the input-output is a distribution point computer, and wherein the in-flight entertainment device is configured to display the decrypted audiovisual files on the visual display after disconnection from the distribution point host computer.

17. The system of claim 16, wherein the in-flight entertainment device is configured for use during a commercial airline flight, separate from the distribution point host computer.

* * * * *